US010410509B2

(12) United States Patent
Berry et al.

(10) Patent No.: US 10,410,509 B2
(45) Date of Patent: Sep. 10, 2019

(54) SYSTEM AND METHOD FOR PROVIDING TAILORED EMERGENCY ALERTS

(71) Applicant: Walmart Apollo, LLC, Bentonville, AR (US)

(72) Inventors: Jesse Berry, Centerton, AR (US); Yurgis M. Bacallao, Centerton, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 15/926,705

(22) Filed: Mar. 20, 2018

(65) Prior Publication Data
US 2018/0276977 A1 Sep. 27, 2018

Related U.S. Application Data

(60) Provisional application No. 62/475,277, filed on Mar. 23, 2017.

(51) Int. Cl.
*G08B 25/01* (2006.01)
*G08B 27/00* (2006.01)
*H04W 4/021* (2018.01)
*H04W 4/90* (2018.01)

(52) U.S. Cl.
CPC ......... *G08B 25/016* (2013.01); *G08B 27/005* (2013.01); *G08B 27/006* (2013.01); *H04W 4/021* (2013.01); *H04W 4/90* (2018.02)

(58) Field of Classification Search
CPC .. G08B 25/016; G08B 27/006; G08B 27/005; H04W 4/90; H04W 4/021
See application file for complete search history.

(56) References Cited

U.S. PATENT DOCUMENTS

| 6,584,375 B2 | 6/2003 | Bancroft et al. |
| 7,362,852 B1 * | 4/2008 | Rodkey .................. G06Q 10/10 379/252 |
| 7,684,548 B1 * | 3/2010 | Rodkey ............... H04L 12/1895 379/221.11 |

(Continued)

FOREIGN PATENT DOCUMENTS

| JP | 2014044603 A | 3/2014 |
| WO | 2016061626 A1 | 4/2016 |

OTHER PUBLICATIONS

International Search Report and Written Opinion dated Jun. 7, 2018 in corresponding International Application No. PCT/US2018/023373 (8 pp).

(Continued)

*Primary Examiner* — Mazda Sabouri
(74) *Attorney, Agent, or Firm* — Venable LLP; Jeffri A. Kaminski

(57) ABSTRACT

Systems, methods, and computer-readable storage media for providing tailored emergency alerts to individuals based on their job titles, age, experience, location, and other factors. Systems configured as described herein receive notification of an alert, identify individuals who need to receive the alert, then tailor instructions for those individuals to follow in responding to the alert based on individual factors. The tailored instructions are then transmitted to mobile devices of the individuals, while general instructions can be broadcast over intercom systems, the general instructions being customized to the alert.

20 Claims, 4 Drawing Sheets

(56) References Cited

U.S. PATENT DOCUMENTS

| | | | |
|---|---|---|---|
| 7,920,060 B2 | 4/2011 | Saito | |
| 9,980,112 B1* | 5/2018 | Newby | H04W 4/90 |
| 2006/0028397 A1 | 2/2006 | O'Rourke | |
| 2009/0063234 A1* | 3/2009 | Refsland | G06Q 10/06 |
| | | | 705/7.15 |
| 2009/0144156 A1 | 6/2009 | Girgis et al. | |
| 2009/0309742 A1 | 12/2009 | Alexander et al. | |
| 2013/0183924 A1 | 7/2013 | Saigh et al. | |
| 2015/0348220 A1 | 12/2015 | Sharma et al. | |
| 2016/0125156 A1 | 5/2016 | Mehra et al. | |
| 2017/0148306 A1* | 5/2017 | Wolfson | G08B 25/016 |
| 2018/0315150 A1* | 11/2018 | Comello | G08B 7/066 |

OTHER PUBLICATIONS

"Emergency alerts and monitoring system for retail storefronts, shopping centers and malls. Our automated emergency alerts integrate into your retail store alarm systems.", Status Solutions; http://www.statussolutions.com/markets-served/retail; accessed Jan. 10, 2017 (3 pp).

* cited by examiner

SYSTEM AND METHOD FOR PROVIDING TAILORED EMERGENCY ALERTS

BACKGROUND

1. Technical Field

The present disclosure relates to providing customized emergency alerts, and more specifically to individually tailoring emergency alerts to people, building intercom systems, and locations.

2. Introduction

Wireless emergency alerts allow individuals with wireless phones or other enabled mobile devices to receive geographically-targeted messages alerting them of threats to safety in their area. Examples of these alerts can include evacuation orders, shelter-in-place orders due to severe weather or a terrorist threat, notification of a chemical spill, Amber alerts, or silver alerts. These emergency alerts can be authorized by a government or other body, and can automatically be transmitted from nearby cellular towers and routers to cell phones, tablets, other mobile devices of individuals, and intercom systems in a given geographic area.

SUMMARY

A method as described herein can include receiving, at a server associated with a geographic area, an alert notification to be communicated to a plurality of individuals associated with the geographic area; identifying, for a first individual in the plurality of individuals, a first job title; generating a first list of instructions for the first individual describing how to respond to the alert notification, the first list of instructions being based on the first job title and the alert notification; identifying, for a second individual in the plurality of individuals, a second job title which is distinct from the first job title, wherein the first job title has a higher level of authority than the second job title; generating a second list of instructions for the second individual describing how to respond to the alert notification, the second list of instructions being based on the second job title and the alert notification; retrieving, from a database and based on the alert notification, a generalized list of instructions for broadcast over an intercom system; transmitting the generalized list of instructions to the intercom system for broadcast; transmitting the alert notification and the first list of instructions to a first device associated with the first individual; and transmitting the alert notification and the second list of instructions to a second device associated with the second individual.

A system as described herein can include a processor and a computer-readable storage medium having instructions stored which, when executed by the processor, cause the processor to perform operations including: receiving an alert notification to be communicated to a plurality of individuals associated with a geographic area, the geographic area comprising a contiguous land area; identifying, for a first individual in the plurality of individuals, a first job title; retrieving, from a database, a first list of instructions based on the first job title and the alert notification; identifying, for a second individual in the plurality of individuals, a second job title which is distinct from the first job title, wherein the first job title has a higher level of authority than the second job title; retrieving, from a database, a second list of instructions based on the second job title and the alert notification; retrieving, from a database and based on the alert notification, a generalized list of instructions for broadcast over an intercom system; transmitting the generalized list of instructions to the intercom system for broadcast; transmitting the alert notification and the first list of instructions to a first device associated with the first individual; and transmitting the alert notification and the second list of instructions to a second device associated with the second individual.

A non-transitory computer-readable storage device configured as disclosed herein can have instructions stored which, when executed by a computing device, cause the computing device to perform operations which can include receiving an alert notification to be communicated to a plurality of individuals associated with a geographic area; identifying, for a first individual in the plurality of individuals, a first job title; retrieving, from a database, a first list of instructions based on the first job title and the alert notification; identifying, for a second individual in the plurality of individuals, a second job title which is distinct from the first job title; retrieving, from a database, a second list of instructions based on the second job title and the alert notification; transmitting the alert notification and the first list of instructions to a first device associated with the first individual; and transmitting the alert notification and the second list of instructions to a second device associated with the second individual.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

DETAILED DESCRIPTION

Figure 1A:
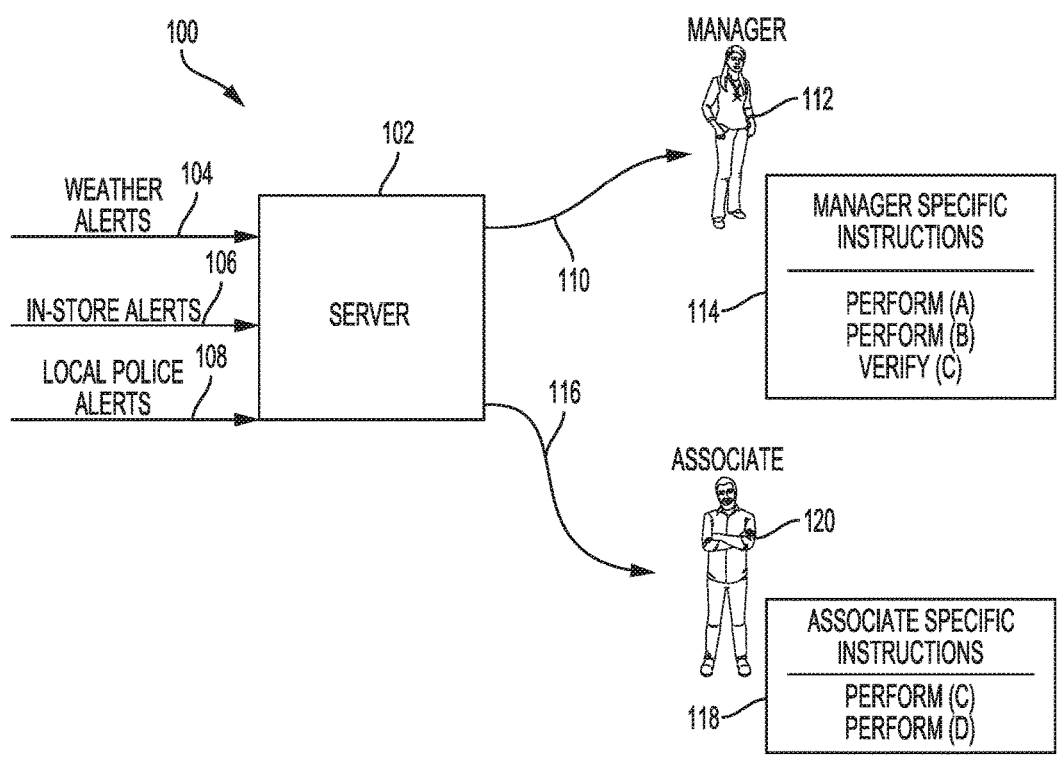
FIG. 1A illustrates an example system architecture.

While systems currently exist for transmitting emergency alerts to cell phones and other devices associated with individuals, these systems do not provide for alerts which are tailored to the individuals based on job title, location, current activities, experience, education, and/or other factors. Instead, the alerts and messages sent to the group of individuals are identical across the group.

By contrast, the emergency alerts and messages generated according to this disclosure are tailored to the respective individuals who are receiving the alerts, or to an intercom system for a building. For example, the manager of a store may receive a distinct alert than a store associate. More specifically, the manager may receive a notification of the alert with specific instructions for the manager to perform, while the store associate may also receive the notification of the alert with different instructions specific to that store associate. In addition to the manager and store associate receiving distinct instructions, the store intercom system may receive still further distinct instructions, such as an instruction to begin broadcasting a "shelter in place" notification, or an immediate evacuation notification. In this example, the store intercom would then be broadcasting emergency instructions to customers while the manager and store associate carry out the individualized emergency instructions they received via mobile devices.

The emergency alerts can, for example, be generated remotely and received at a server which determines which stores, buildings, or other geographic areas are affected by the emergency alert. For example, the National Weather Service can generate weather related alerts which are received at a server for the national headquarters of a company. The server can then identify assets (buildings, stores, distribution centers, shipping assets (i.e., trucks) which may be affected by the weather alert and generate customized instructions for the assets which will be affected by the alert. As another example, the server at the national headquarters can receive a notification of an active shooter at a location near company assets and provide customized instructions based on the relative distance of the event. If, for example, the active shooter is within a half mile of a company store, the instructions may be tailored along a "shelter in place" plan, whereas if the active shooter is within a five mile radius of the store, the instructions may be tailored along a "be aware, provide emergency services" plan. In some circumstances, the emergency alert could identify the current location of the event, determine a distance "x" between the company store and the event location, and report to the company store that the last reported location of the threat was "x."

In other configurations, the server receiving the notification can be specific to a given geographic area. For example, the server receiving the National Weather Service alert can be specific to an amusement park, and can customize instructions for park administration and park employees based on locations and roles of the respective individuals. Likewise, the server receiving the alert may be specific to a store, building, distribution center, park, or other defined, contiguous geographic area.

The instructions given to various individuals can vary based on the titles/jobs of the individuals. For example, if a server receives a tornado warning alert, the server can identify assets within the area affected by the tornado warning. If one of the assets is a store, the server can then retrieve instructions (such as specific actions, steps, verifications) which need to be taken by the manager of the store, and distinct instructions which need to be taken by associates within the store. For example, the store associates may receive instructions to (1) lock cash registers and (2) direct customers to a reinforced portion of the store for safety, while the manager of the store may receive instructions to direct people within the reinforced portion of the store.

Consider another example, where an active shooter is identified outside the building. The identification of the active shooter could be based on an associate or other individual reporting the shooter, or could be based on video, audio, or other surveillance data identifying gunfire in the parking lot. When the server receives the notification or makes the determination that an active shooter is outside, the system could identify the manager and issue instructions to the manager to move store associates and customers to a shelter-in-place location. The system can also provide instructions to the manager to lock doors based on the manager's location, customer locations, associate locations, police locations, and the locations of individuals involved in the shooting. If, for example, the system determines that there is substantial risk of harm if the manager were to move from her current location (for example, based on location of the manager, the location of the shooter, and door locations), then the system may refrain from sending instructions to lock doors and instead provide other instructions.

In other circumstances, an active shooter plus victims might not be identified, but gunfire may be identified, and may therefore cause an emergency notification. For example, if a building, store, park, or other geographic area had acoustic sensors deployed to detect gunfire, those acoustic sensors might detect a gunshot and signal to a server to generate an alert that gunfire is occurring on the premises or nearby. Based on that alert, tailored instructions can be provided to employees, customers, and other individuals on the premises. For example, if the gunfire were detected outside the front of a building, a store associate may receive instructions to lead people to the rear of the building while a store manager may receive instructions to lock the front doors. In addition, the server can automatically alert law enforcement using a tailored message regarding the location of the gunfire, the type of weapon, etc. In another example, sensors may detect gunfire moving along a path and provide individualized instructions based on the direction of that path. For example, if the gunfire were moving away from a building, a previous instruction to shelter in place can be modified to "exercise caution and proceed to the nearest exit," or similar modification to previous instructions.

While the instructions provided to each individual, or group of individuals, can be based on their respective job titles (Manager, Associate, Law Enforcement, etc.), the instructions may also be based on other factors. For example, the instructions may be given to individuals based on their respective locations. In one example, a store associate who is not near the cash registers may not receive the instruction to lock the cash registers, but may receive an instruction based on the store associate's current location. This location can be determined by the server, for example, based on the location of a device specific to that individual (mobile phone, smart phone, MC40, etc.). If, for example, the server identifies that the associate is near the gun section of a store, the server may tailor the instructions for that specific associate to include the instruction to lock the gun case. Likewise, if the server identifies that the associate is near the jewelry or electronics sections, the server may send specific instructions to lock items before leaving the area. If an associate is near a changing room section, the server may inform the associate to begin knocking on doors and speaking in a loud voice, asking people to please move from the changing room area. In addition, the server can generate and develop instructions for evacuation from a building or area of the store. These evacuation instructions can include directions based on parts of the store ("Please move towards the entrance," "Please move towards the garden section) or based on cardinal directions ("Please move to the North East wall"). Likewise, such instructions can provide codes, if determined to be necessary, so that the individual can access portions of a geographic area they may not otherwise be authorized to access. ("Please go to the Manager's Office and enter code 5512").

If the alert were received at an office building, some of the personnel may be assigned to be the final check and receive distinct instructions than the general instructions. If, for example, a fire alarm were issued for the building, individuals may receive an alert on their smart phones instructing the individuals on where the nearest exit is located and to proceed to that exit immediately. A supervisor or other individual with an emergency supervisor role may, instead of receiving instructions to immediately evacuate, may receive instructions to confirm that the floor is clear before leaving.

The instructions sent by the server to the individuals can also be varied according to other factors, such as experience, age, education, and language fluency. With regard to experience, the server may transmit distinct instructions to someone who has experienced this type of scenario multiple times rather than to someone undergoing the experience for the first time. With regard to age, the server may instruct an older individual to shelter in place while instructing the younger individual to evacuate if possible. For education, there may be procedures or processes which need to occur which only certain individuals are trained to accomplish. For example, an alert may inform a trained individual to turn on generator power in a power outage, while other individuals are instructed to shelter in place. With regard to language fluency, the server may determine that certain individuals should receive the alert and instructions in a different language than other individuals, and accordingly employ a machine translation algorithm on the alert/instructions. In other configurations, the server may retrieve instructions in that other language, or may send the individual the alert/instructions in both languages.

The instructions sent by the server can also include a link to a website, database, or other resource where the instructions to be performed are stored. In such configurations, the notification transmitted by the server, and received on the mobile device of the individual, could have a description of the alert, followed by a link to the web site. Alternatively, the message sent by the server could only contain the link, or could automatically trigger the individual's device receiving the message to open the link.

These and various other embodiments of the disclosure are described in detail below. While specific implementations are described, it should be understood that this is done for illustration purposes only. Other components and configurations may be used without parting from the spirit and scope of the disclosure.

FIG. 1A illustrates an example system architecture 100 for providing individually tailored emergency alerts as disclosed herein. In this example 100, a server 102 receives alert notifications 104, 106, 108 from a variety of sources. These sources can include the National Weather Service (in the form of weather alerts 104), store associates (reporting in-store alerts 106), and local police alerts 108. Examples of National Weather Service weather alerts 104 can include tornado watches and warnings, high wind advisories, hurricane/cyclone advisories, etc. Other types of information, such as earthquake or tsunami warnings, may come from other agencies or resources, and may likewise be received by the server 102. Similarly, the weather alerts 106 can come from resources other than the National Weather Service, such as local television stations, radio, or Internet resources. The weather warnings 104 may be accompanied by information specifying the geographic area affected by the event. Examples of in-store alerts 106, generated by on-site personnel, may include notification of a spill or cleanup required in a portion of a building, store, or park; suspicion of shop-lifting; active shooter; additional help required (such as help needed at check-out counters, help needed moving materials within a building, or the presence of security personnel); and/or requesting a supervisor/manager's presence. While the illustration 100 shows local police alerts 108 as being received by the server 102, additional local alerts, including fire department alerts, Amber alerts, silver alerts, etc., may also be received by the server 102.

The server 102 receives the various alerts 104-108 and notifications, then proceeds to determine who should be informed of the alerts 104-108, and what actions those individuals need to perform based on the alert. As described above, in some configurations, the server 102 may need to identify specific geographic areas (buildings, stores, parks, etc.) which will be affected by the alert, then identify people within those geographic areas. In other configurations, the server 102 will be specific to an affected geographic area, and can immediately begin identifying people who will receive the alert (skipping the identification of geographic area step). As individuals needing to receive notification of the alert are identified by the server 102, the server begins retrieving instructions which are specific to that individual. Such specific instructions can be tailored based on factors specific to the individual, such as job title, location, experience, education, language, and/or gender. In this case 100, the server 102 has identified a manager 112 and retrieved manager specific instructions 114 which the manager 112 needs to perform. The server 102 can modify these instructions 114 as needed, then transmits 110 the manager instructions 114 to a device (smartphone, tablet, computer, etc.) associated with the manager 112. Similarly, the server 102 has identified an associate 120 (i.e., someone having a lower role than the manager 112, or someone with distinct responsibilities than those of the manager 112) who should receive the alert and specific instructions. The server 102 retrieves associate specific instructions 118, which can be modified as required, and transmits 116 the associate instructions 118 to a device associated with the associate 120.

In this example 100, the manager 112 is tasked with performing steps (A) and (B), while the associate is tasked with performing steps (C) and (D). In addition, the manager is further tasked with verifying that step (C) is accomplished. In some configurations, the instructions 114, 118 given to the manager 112 and the associate 120 can have time-specific instructions (i.e., do action (X) at 3:30 pm) and/or 'do this, then that' instructions (i.e., do action (Y), then action (Z)).

Figure 1B:
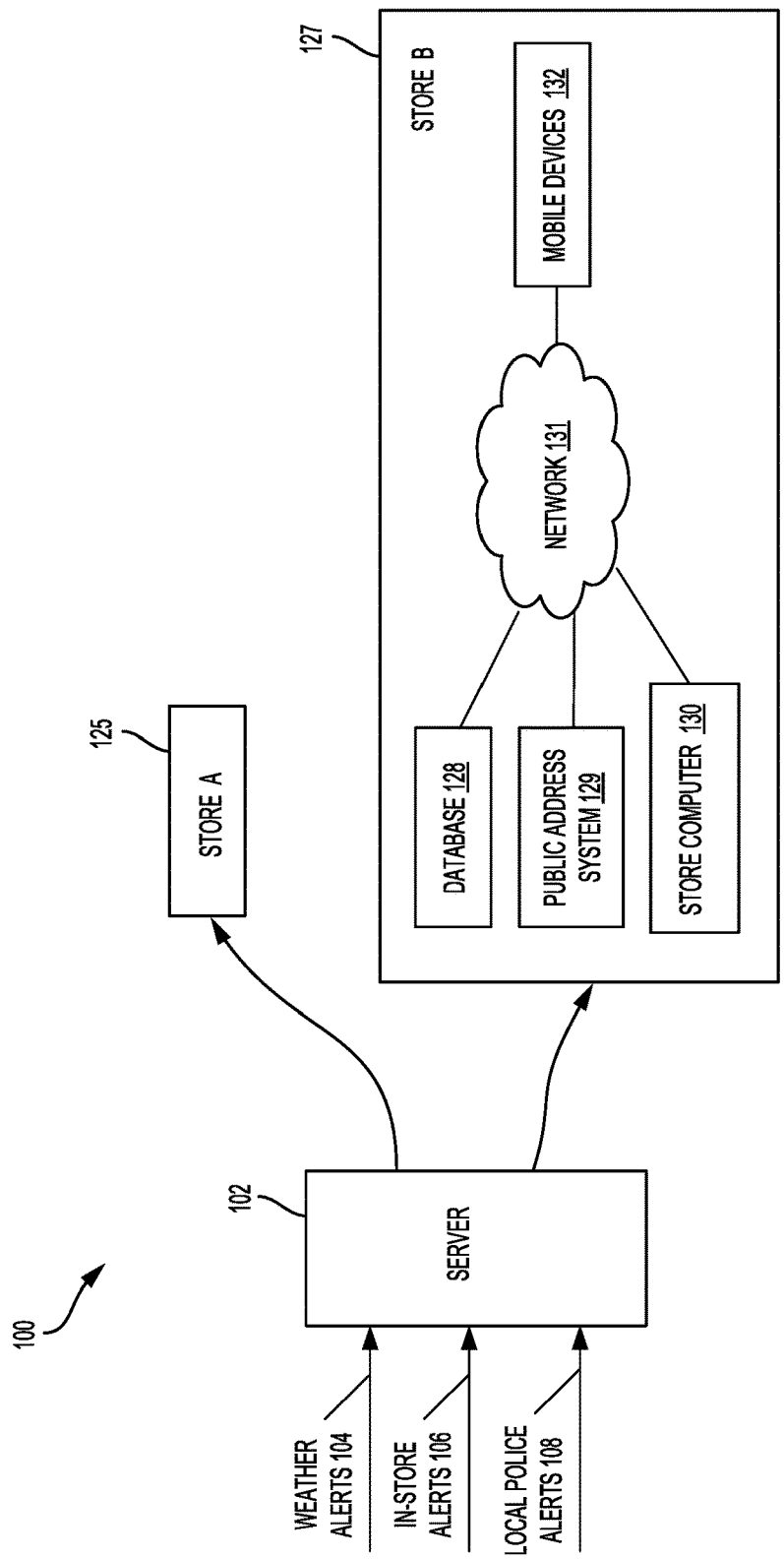
FIG. 1B illustrates another example system architecture.

FIG. 1B. illustrates another embodiment of an exemplary system. Server 102 communicates with a network of store computer systems. Two stores, Store A 125 and Store B 127 are shown, although in practice the server 102 will be in communication with hundreds of stores. Similar to FIG. 1, server 102 may receive the various alerts 104-108 and notifications. A program or application executing on the server 102 includes logic that analyzes the alerts, along with other information, and determines when to send a notification and to what store the notification is to be sent. The logic may predefine what action is taken is when particular circumstances arise. A database may store, for example in a table, the alert, actions to be taken associated with the alert, and a code associated with the alert.

Store B illustrates an exemplary system that may be present in a retail store. A store computer system 130, public address system 129, database 128, and mobile devices 132 may be part of the system and communicate with each other over a network 131. One of more of these devices may be combined, such as the computer 130 and database 128. The server 102 may send the notification to one or more of the store computer system 130 and the mobile devices 132. The notification may signal for an application or program on the store computer system 130 or mobile device 132 to display an alert icon or button. Selection of the button or icon may cause the notification message, actions to be take or a code to be displayed. If a code is provided, clicking or selecting the code may cause the device to communicate with the database 128 to retrieve additional information, such as the alert and action to be taken.

In some cases the action to be taken may be to cause a message to be played over the public address system 129. The database 128 may store the messages to be played. The notification may be sent to the public address system 128 directly from server 102 or from the store computer system 130. Alternatively, the notification may display the alert on the mobile device 132 of the manager or associate, or on the store computer system 130, and they may need to take action to authorize the message to be played.

The mobile devices 132 may also be configured to cause a message to be played over the public address system 129. For example, alerts may be placed into different classifications, such as high, medium, or low. The mobile devices 132 may be authorized to initiate alerts for low level events. Such events may be common or local to that store, such as a lost child in the store. Upon actuation, the mobile device 132 or store computer system 130 can be configured to send a code to the public address system 129 to play a message in the event of a lost child. The code can be used to look up the message to be played from the database 128, or the message may be included as part of the information sent to the public address system 129.

Figure 2:
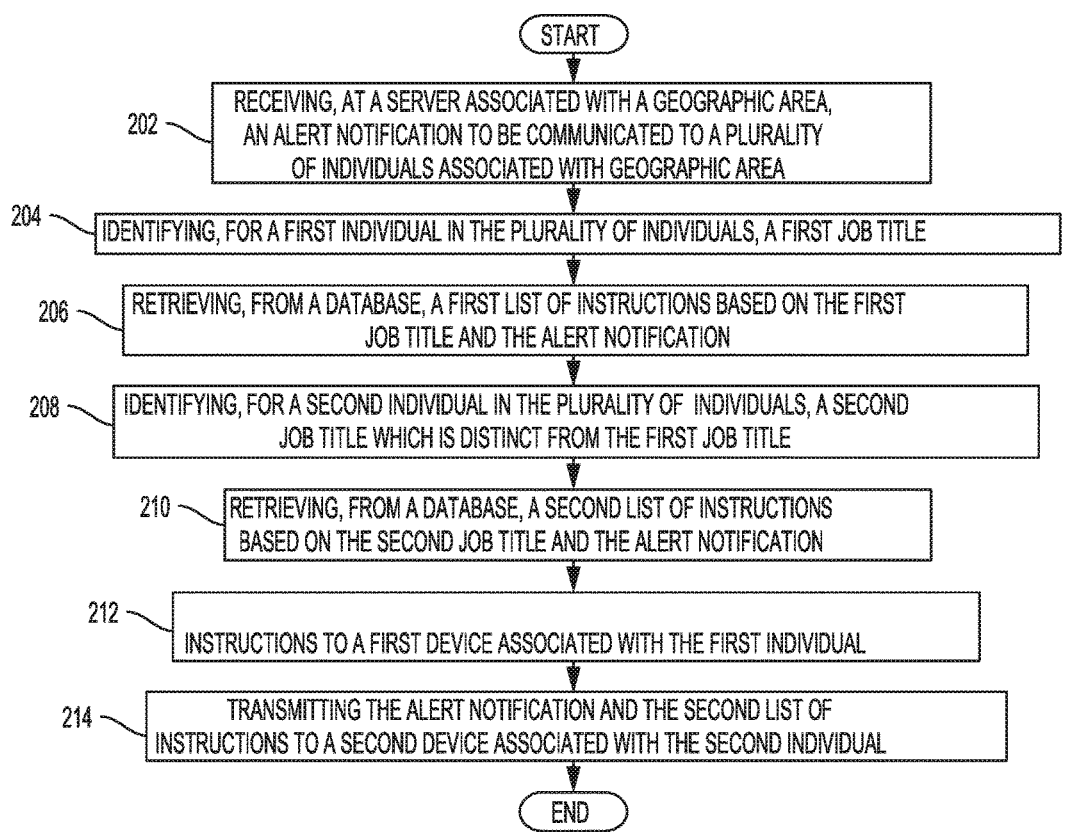
FIG. 2 illustrates an example method embodiment.

FIG. 2 illustrates an example method embodiment. The steps outlined herein are exemplary and can be implemented in any combination thereof, including combinations that exclude, add, or modify certain steps.

A server 102 configured to perform this method, and associated with a geographic area, can receive an alert notification to be communicated to a plurality of individuals associated with the geographic area (202). The server 102 can identify, for a first individual in the plurality of individuals, a first job title (204) and retrieve from a database, a first list of instructions based on the first job title and the alert notification (206). The server 102 can also identify, for a second individual in the plurality of individuals, a second job title which is distinct from the first job title (208) and retrieve, from a database, a second list of instructions based on the second job title and the alert notification (210). The database from which the first list of instructions are retrieved may, or may not, be the same database from which the second list of instructions are retrieved. In addition, in some configurations, rather than retrieving the instructions, the server 102 generates the instructions according to preconfigured guidelines and procedures. The server 102 then transmits the alert notification and the first list of instructions to a first device associated with the first individual (212) and transmits the alert notification and the second list of instructions to a second device associated with the second individual (214).

Examples of the alert notification can include a weather alert, a local police alert, an active shooter alert, a cleanup alert, and a help required alert. Examples of a geographic area include a building, a store, a park, an amusement park, and a cluster of buildings located within a contiguous geographic space (i.e., a campus). In some cases, the geographic area can be identified based on the geographic area being within a specified radius of an event which prompted the alert notification. For example, a store may be selected as the geographic area because the store is within a five mile radius of an active shooter.

In some configurations, the retrieving of the first and second lists of instructions can further include modifying the respective lists of instructions based on the job title, experience, age, gender, education, and/or location of the individual receiving the instructions. The instructions can, for example, include actions and processes for the individual to follow based on the alert received. As an example, the instructions can provide evacuation directions from the geographic area (i.e., a building) based on a current location of the individual receiving the instructions. Similarly, the instructions can include a web link to an Internet site, where the Internet site contains the instructions for the individual, including actions to be performed by the individual.

Figure 3:
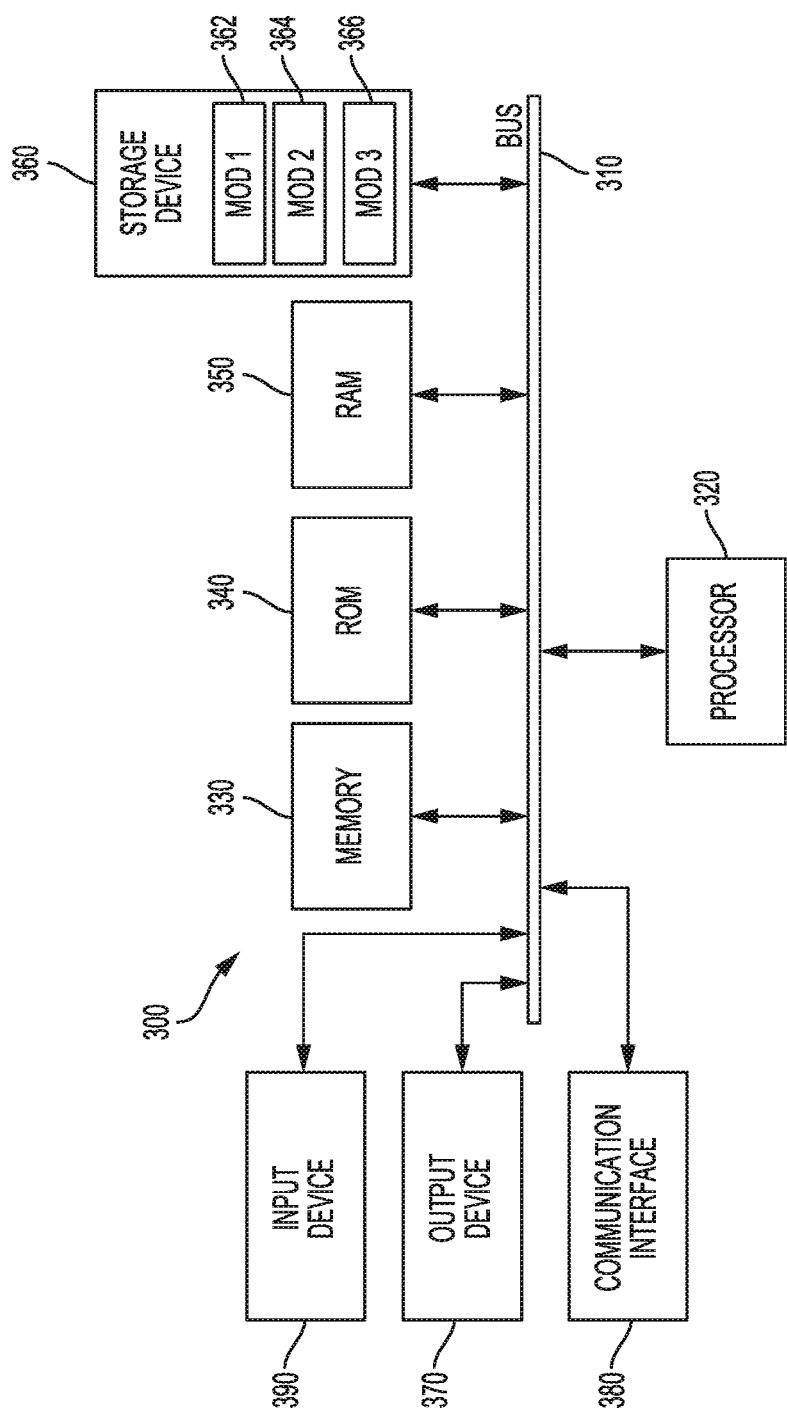
FIG. 3 illustrates an example computer system which can be used to perform concepts disclosed herein.

With reference to FIG. 3, a general-purpose computing device 300 is illustrated which can be used for performing the disclosed concepts. The genera-purpose computing device 300 can include a processing unit (CPU or processor) 320 and a system bus 310 that couples various system components including the system memory 330 such as read only memory (ROM) 340 and random access memory (RAM) 350 to the processor 320. The system 300 can include a cache of high speed memory connected directly with, in close proximity to, or integrated as part of the processor 320. The system 300 copies data from the memory 330 and/or the storage device 360 to the cache for quick access by the processor 320. In this way, the cache provides a performance boost that avoids processor 320 delays while waiting for data. These and other modules can control or be configured to control the processor 320 to perform various actions. Other system memory 330 may be available for use as well. The memory 330 can include multiple different types of memory with different performance characteristics. It can be appreciated that the disclosure may operate on a computing device 300 with more than one processor 320 or on a group or cluster of computing devices networked together to provide greater processing capability. The processor 320 can include any general purpose processor and a hardware module or software module, such as module 1 362, module 2 364, and module 3 366 stored in storage device 360, configured to control the processor 320 as well as a special-purpose processor where software instructions are incorporated into the actual processor design. The processor 320 may essentially be a completely self-contained computing system, containing multiple cores or processors, a bus, memory controller, cache, etc. A multi-core processor may be symmetric or asymmetric.

The system bus 310 may be any of several types of bus structures including a memory bus or memory controller, a peripheral bus, and a local bus using any of a variety of bus architectures. A basic input/output (BIOS) stored in ROM 340 or the like, may provide the basic routine that helps to transfer information between elements within the computing device 300, such as during start-up. The computing device 300 further includes storage devices 360 such as a hard disk drive, a magnetic disk drive, an optical disk drive, tape drive or the like. The storage device 360 can include software modules 362, 364, 366 for controlling the processor 320. Other hardware or software modules are contemplated. The storage device 360 is connected to the system bus 310 by a drive interface. The drives and the associated computer-readable storage media provide nonvolatile storage of computer-readable instructions, data structures, program modules and other data for the computing device 300. In one aspect, a hardware module that performs a particular function includes the software component stored in a tangible computer-readable storage medium in connection with the necessary hardware components, such as the processor 320, bus 310, display 370, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 300 is a small, handheld computing device, a desktop computer, or a computer server.

Although the exemplary embodiment described herein employs the hard disk 360, other types of computer-readable media which can store data that are accessible by a computer, such as magnetic cassettes, flash memory cards, digital versatile disks, cartridges, random access memories (RAMs) 350, and read only memory (ROM) 340, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 300, an input device 390 represents any number of input mechanisms, such as a microphone for speech, a touch-sensitive screen for gesture or graphical input, keyboard, mouse, motion input, speech and so forth. An output device 370 can also be one or more of a number of output mechanisms known to those of skill in the art. In some instances, multimodal systems enable a user to provide multiple types of input to communicate with the computing device 300. The communications interface 380 generally governs and manages the user input and system output. There is no restriction on operating on any particular hardware arrangement and therefore the basic features here may easily be substituted for improved hardware or firmware arrangements as they are developed.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A method comprising:
   receiving, at a server associated with a geographic area, an alert notification for an incident to be communicated to a plurality of individuals associated with the geographic area;
   identifying, at the server, an incident location of the incident;
   identifying, for a first individual in the plurality of individuals, a first job title;
   identifying, for the first individual, a first individual location within the geographic area;
   generating a first list of instructions for the first individual describing how to respond to the alert notification, the first list of instructions being based on: (1) the first job title, (2) the first individual location, and (3) the alert notification, the first list of instructions providing a first route from the first individual location to a second location by avoiding the incident location;
   identifying, for a second individual in the plurality of individuals, a second job title which is distinct from the first job title, wherein the first job title has a higher level of authority than the second job title;
   identifying, for the second individual, a second individual location within the geographic area;
   generating a second list of instructions for the second individual describing how to respond to the alert notification, the second list of instructions being based on: (1) the second job title, (2) the second individual location, and (3) the alert notification, the second list of instructions providing a second route from the second individual location to the second location by avoiding the incident location;
   generating, based on the alert notification and the incident location, a generalized list of instructions for broadcast over an intercom system, the generalized list of instructions directing people away from the incident location;
   transmitting the generalized list of instructions to the intercom system for broadcast;
   transmitting the alert notification and the first list of instructions to a first device associated with the first individual; and
   transmitting the alert notification and the second list of instructions to a second device associated with the second individual.

2. The method of claim 1, further comprising:
   identifying, based on the alert notification, additional actions to be assigned to the plurality of individuals;
   partitioning, based on the current first location of the first individual and the current second location of the second individual, the additional actions into a first portion of additional actions and a second portion of additional actions;
   transmitting the first portion of additional actions to the first device; and
   transmitting the second portion of the additional actions to the second device.

3. The method of claim 1, wherein the alert notification is associated with one of a weather alert, an active shooter alert, and a local police alert.

4. The method of claim 1, wherein generating the first list of instructions further comprises modifying the first list of instructions based on the first job title and the current first location; and
   wherein generating the second list of instructions further comprises modifying the second list of instructions based on the second job title and the current second location.

5. The method of claim 1, wherein the geographic area is a building, and wherein the building is located within a specified radius of an event which prompted the alert notification.

6. The method of claim 1, wherein at least one instruction is removed from the second list of instructions due to the second route.

7. The method of claim 1, wherein at least one of the first list of instructions and the second list of instructions comprises a web link, where the web link, when selected, will retrieve instructions for an individual from the Internet.

8. A system comprising:
   a processor; and
   a computer-readable storage medium having instructions stored which, when executed by the processor, cause the processor to perform operations comprising:
   receiving an alert notification for an incident to be communicated to a plurality of individuals associated with a geographic area, the geographic area comprising a contiguous land area;
   identifying an incident location of the incident;
   identifying, for a first individual in the plurality of individuals, a first job title;
   identifying, for the first individual, a first individual location within the geographic area;
   generating, from a database, a first list of instructions based on: (1) the first job title, (2) the first individual location, and (3) the alert notification, the first list of instructions providing a first route from the first individual location to a second location by avoiding the incident location;

identifying, for a second individual in the plurality of individuals, a second job title which is distinct from the first job title, wherein the first job title has a higher level of authority than the second job title;

identifying, for the second individual, a second individual location within the geographic area;

generating, from a database, a second list of instructions based on: (1) the second job title, (2) the second individual location, and (3) the alert notification, the second list of instructions providing a second route from the second individual location to the second location by avoiding the incident location;

generating, based on the alert notification, a generalized list of instructions for broadcast over an intercom system, the generalized list of instructions directing people away from the incident location;

transmitting the generalized list of instructions to the intercom system for broadcast;

transmitting the alert notification and the first list of instructions to a first device associated with the first individual; and transmitting the alert notification and the second list of instructions to a second device associated with the second individual.

9. The system of claim 8, wherein the alert notification is associated with a weather alert.

10. The system of claim 8, further comprising:
acoustic sensors,
wherein the computer-readable storage medium has additional instructions stored which, when executed by the processor, cause the processor to perform operations comprising:
receiving audio data from the acoustic sensors;
identifying, within the audio data, gunshot sounds; and
deriving the incident location from the gunshot sounds within the audio data.

11. The system of claim 8, wherein generating the first list of instructions further comprises modifying the first list of instructions based on the first job title and the first individual location; and
wherein generating the second list of instructions further comprises modifying the second list of instructions based on the second job title and the second individual location.

12. The system of claim 8, wherein the geographic area is located within a specified radius of an event which prompted the alert notification.

13. The system of claim 8, wherein at least one instruction is removed from the second list of instructions due to the second route.

14. The system of claim 8, wherein at least one of the first list of instructions and the second list of instructions comprises a web link, where the web link, when selected, will retrieve instructions for an individual from the Internet.

15. A non-transitory computer-readable storage device having instructions stored which, when executed by a computing device, cause the computing device to perform operations comprising:
receiving an alert notification for an incident to be communicated to a plurality of individuals associated with a geographic area, the geographic area comprising a contiguous land area;
identifying an incident location of the incident;
identifying, for a first individual in the plurality of individuals, a first job title;
identifying, for the first individual, a first individual location within the geographic area;
generating, from a database, a first list of instructions based on: (1) the first job title, (2) the first individual location, and (3) the alert notification, the first list of instructions providing a first route from the first individual location to a second location by avoiding the incident location;
identifying, for a second individual in the plurality of individuals, a second job title which is distinct from the first job title, wherein the first job title has a higher level of authority than the second job title;
identifying, for the second individual, a second individual location within the geographic area;
generating, from a database, a second list of instructions based on: (1) the second job title, (2) the second individual location, and (3) the alert notification, the second list of instructions providing a second route from the second individual location to the second location by avoiding the incident location;
generating, based on the alert notification, a generalized list of instructions for broadcast over an intercom system, the generalized list of instructions directing people away from the incident location;
transmitting the generalized list of instructions to the intercom system for broadcast;
transmitting the alert notification and the first list of instructions to a first device associated with the first individual; and
transmitting the alert notification and the second list of instructions to a second device associated with the second individual.

16. The non-transitory computer-readable storage device of claim 15, wherein the alert notification is associated with a weather alert.

17. The non-transitory computer-readable storage device of claim 15, having additional instructions stored which, when executed by the computing device, cause the computing device to perform operations comprising:
receiving audio data from acoustic sensors;
identifying, within the audio data, gunshot sounds; and
deriving the incident location from the gunshot sounds within the audio data.

18. The non-transitory computer-readable storage device of claim 15, wherein retrieving the first list of instructions further comprises modifying the first list of instructions based on the first job title and the first individual location; and
wherein retrieving the second list of instructions further comprises modifying the second list of instructions based on the second job title and the second individual location.

19. The non-transitory computer-readable storage device of claim 15, wherein the geographic area is located within a specified radius of an event which prompted the alert notification.

20. The method of claim 1, further comprising:
predicting, via the processor, an incident path, the incident path identifying a path from the incident location to a future incident location; and
modifying the first route and the second route based on the incident path.

* * * * *